US006274689B1

(12) United States Patent
Shaffer et al.

(10) Patent No.: US 6,274,689 B1
(45) Date of Patent: *Aug. 14, 2001

(54) RANDOM ISOMONOOLEFIN/ALLYL STYRENE COPOLYMERS AND FUNCTIONALIZED DERIVATIVES THEREOF

(75) Inventors: Timothy Daniel Shaffer, Houston; David Yen-Lung Chung, Bellaire, both of TX (US)

(73) Assignee: Exxon Chemical Patents, Inc., Baytown, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,787

(22) Filed: Oct. 7, 1998

(51) Int. Cl.$^7$ .............................. C08F 236/20; C08F 8/40

(52) U.S. Cl. .......................... 526/336; 526/237; 526/308; 526/348.7; 525/332.1; 525/333.3; 525/333.4; 525/333.5; 525/333.6; 525/340; 525/342; 525/344; 525/351; 525/355; 525/356; 525/379; 525/384

(58) Field of Search ...................................... 526/237, 308, 526/336, 348.7; 525/332.1, 333.3, 333.4, 333.5, 333.6, 340, 342, 344, 351, 355, 356, 379, 384

(56) References Cited

U.S. PATENT DOCUMENTS

| | | | |
|---|---|---|---|
| 2,830,973 | * 4/1958 | Leary | 526/336 X |
| 2,989,515 | * 6/1961 | Bruton et al. | 526/336 X |
| 3,067,182 | 12/1962 | Jones | 260/87.5 |
| 3,299,020 | 1/1967 | Hunter et al. | 260/87.5 |
| 4,000,958 | 1/1977 | Hirooka et al. | 427/389 |
| 4,074,035 | 2/1978 | Powers et al. | 526/185 |
| 4,910,321 | 3/1990 | Kennedy et al. | 549/213 |
| 4,929,671 | * 5/1990 | Kunz et al. | 525/333.3 X |
| 5,162,445 | 11/1992 | Powers et al. | 525/333.4 |
| 5,169,914 | 12/1992 | Kaszas et al. | 526/135 |
| 5,342,908 | 8/1994 | Osman | 526/135 |
| 5,350,819 | 9/1994 | Shaffer | 526/189 |
| 5,418,303 | 5/1995 | Shaffer | 526/93 |
| 5,426,167 | 6/1995 | Powers et al. | 526/347 |
| 5,430,118 | 7/1995 | Powers et al. | 526/347 |
| 5,506,316 | 4/1996 | Shaffer | 526/185 |
| 5,543,479 | 8/1996 | Baade et al. | 526/88 |

FOREIGN PATENT DOCUMENTS

| | | |
|---|---|---|
| 0 255 170 A1 | 2/1988 | (EP) . |
| 0 279 463 A2 | 8/1988 | (EP) . |
| 0 537 660 A1 | 4/1993 | (EP) . |
| 0 819 707 A2 | 1/1998 | (EP) . |
| WO 92/11295 | 7/1992 | (WO) . |
| WO 95/07945 | 3/1995 | (WO) . |

OTHER PUBLICATIONS

*Journal of Applied Polymer Science,* v.5(16)–pp. 452–459 (1961)—Jones, et al., "Isobutylene Copolymers of Vinylbenzyl Chloride and Isopropenylbenzyl Chloride".

*Journal of Polymer Science,* v. 41(1959), pp. 359–367—Frisch, K.C., "The Synthesis of Aromatic Divinylogs and Aromatic Halogenated Vinylogs".

*Journal of Polymer Science,* v.5(A–1), pp. 1245–1264 (1967)—D'Alelio, et al., "Linear Polymers of Vinyl Aryl Monomers Containing Another Unsaturated Group".

J. March, *Advanced Organic Chemistry,* 4th edition, John Wiley and Sons, New York (1992)—p. 748.

*Makromol. Chem.,* v.54 (1962)—pp. 119–125, Von G. Greber, et al.

*Dokl. Akad. Nauk, Azerb. SSR,* v.24(2)—(1968)—pp. 20–26, Sadykh–Zade, et al.

* cited by examiner

*Primary Examiner*—Fred Teskin
(74) *Attorney, Agent, or Firm*—Brent M. Peebles; Joseph F. Reidy

(57) ABSTRACT

The invention provides a copolymer of an isomonoolefin having from 4 to 7 carbon atoms and containing a copolymerized alkenyl styrene moiety represented by the formula I:

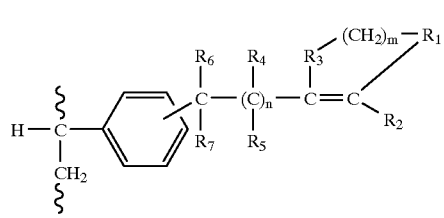

where m=0–2, n=0–20, each of $R_1$ through $R_7$ are independently selected from the group consisting of hydrogen, $C_1$ to $C_{10}$ alkyl and $C_1$ to $C_{10}$ primary or secondary alkyl halides, and at least one of $R_1$, $R_2$ or $R_3$ is hydrogen, and when m=1 or 2, $R_3$ and $R_1$ are —$CH_2$—.

8 Claims, No Drawings

RANDOM ISOMONOOLEFIN/ALLYL STYRENE COPOLYMERS AND FUNCTIONALIZED DERIVATIVES THEREOF

BACKGROUND OF THE INVENTION

1. Field of the Invention

The present invention relates to random copolymers comprising a $C_4$ to $C_7$ isomonoolefin and an alkenylstyrene comonomer, and functionalized derivatives thereof.

2. Description of the Related Art

Halogenated copolymers of isobutylene and up to about 4 mole % of isoprene (butyl rubber) are well known polymer materials whose vulcanizates offer some outstanding properties not possessed by many other diolefin based elastomers. Articles prepared from many cured halogenated elastomers offer improved resistance to oils and greases as well as resistance to oxygen and ozone degradation. Butyl rubber vulcanizates exhibit excellent impermeability to air, water vapor and many organic solvents, as well as resistance to aging and sunlight. These properties render these materials ideal candidates for one or more applications such as tubeless tire innerliners, water hoses, organic fluid hoses, components in tire construction, gaskets, adhesive compositions and various molded articles.

More recently, a new class of halogenated elastomeric interpolymers have been discovered as disclosed in U.S. Pat. No. 5,162,445, which offer many of the same properties as halogenated butyl rubber, but are even more ozone and solvent resistant. These materials are the halogenation product of random copolymers of a $C_4$ to $C_7$ isoolefin, such as isobutylene (IB) and a para-alkystyrene comonomer, such as para-methyl styrene (PMS), wherein at least some of the alkyl substituent groups present in the styrene monomer units contain a functional group such as halogen. The prepared copolymers exhibit homogeneous incorporation of the comonomer over the entire molecular weight range making functionalization equally homogeneous. The benzylic position on the PMS fragment may be selectively functionalized to a variety of groups such as esters, bromides, ethers, thioethers, etc. Additionally, graft copolymers may be prepared. Functional modification of the parent copolymers leads to elastomers with interesting and useful properties. Many of these are disclosed in the '445 patent, in U.S. Pat. No. 5,430,118 and in U.S. Pat. No. 5,426,167. The most important utility of the halogenated copolymers is that the benzylic halide presents new opportunities in crosslinking chemistry while improving oxidative stability of the resulting rubber. The oxidative stability results from the absence of backbone double bonds found in the copolymerized products of conjugated dienes, as in the case of butyl rubber.

Low molecular weight IB/PMS copolymers are attractive copolymers for sealant and coating applications. They offer the inherent attributes of polyisobutylene as well as good weatherability because of the absence of in-chain unsaturation. In addition, versatile functionalization chemistry permits the introduction of a wide variety of functional groups. For example, vinyl groups can be introduced two ways. Metallation of the p-methyl group provides for reaction with electophiles like vinyl chlorosilanes or allyl chloride to yield pendant vinyl groups. Alternatively, IBIPMS copolymers can be halogenated to the benzylic halide and then reacted with the sodium salt of allyl alcohol to yield an allyl ether. Regardless of the process, the introduction of pendant vinyl groups requires at least two post-polymerization steps. It would be advantageous to prepare alkenyl containing IB copolymers by direct copolymerization of the appropriate comonomers.

Vinylbenzyl chlorides have been used as comonomers for IB copolymerization.

U.S. Pat. No. 3,067,182 discloses the copolymerization of 70 to 99 mol% of IB with 30 to 1 mol% of, preferably, para isopropenylbenzyl chloride (IPBC) in an inert 30 solvent using a Friedel-Crafts catalyst, and at a temperature below −50° C. A continuous polymerization method for copolymerizing vinylbenzyl chloride (VBC) (a mixture of meta- and pra-substitution) and isobutylene is disclosed in U.S. Pat. No. 4,074,035. This process necessarily restricts the incorporation of VBC to less than 5 mol% and requires a well-controlled continuous addition of comonomer within a precise range of comonomer ratios in order to prepare gel-free polymers. A similar system is discussed for ortho- and para- mixtures of IPBC in Jones, et al., J Appl. Polym. Sci. 5, 452 (1969).

Allyl halides have also been used as functional monomers in IB copolymerization. Methallyl chloride is used in U.S. Pat. No. 3,299,020 as a comonomer, but the copolymer is said not to contain allylic halides and therefore does not exhibit enhanced cure characteristics. In essence the functional group is lost. Chlorobutyl rubber preparation from methylallyl chloride or 2-chloromethyl-1,3-butadiene is disclosed in Sadykh-Zade et al. in Dokl. Akad Nauk, Azerb. SSR 24, 20 (1968) under conventional cationic polymerization conditions. Up to 2 mol% of the allyl chloride is incorporated into the copolymer. Homologous comonomers are used for halobutyl rubber preparation in U.S. Pat. No. 5,342,908.

Pendant groups, like vinyl alkenyl and allylic, present another class of reactive "functional" groups which are of utility in modifying polymer. These groups are more nucleophilic than backbone vinylene and vinylidenes (March, Advanced Organic Chemistry, $4^{th}$ Ed., John Wiley & Sons, New York, 1992, page 748) formed by copolymerization of conjugated dienes. Pendant alkenyl groups permit reactive crosslinking, and grafting and chemical modification. Many of these reactions occur by simply heating the reagent with the virgin polymer. This process does not create unwanted side products (like halogens) that must be removed from the polymer before use. Preparation of pendant alkenyl groups from the methodologies described above would require post-polymerization functionalization.

Direct copolymerization of alkenyl styrenes would present a novel method of incorporating such pendant alkenyl groups into polyisobutylene. From this class of comonomers, two have been previously prepared and used in anionic polymerizations; p-allylstyrene (K.C. Frisch, J Polym. Sci. 41, 359 (1959); G.F. D'Alelio, T.R. Hoffend, J Polym. Sci., Part A-15, 1245 (1967); and von G. Greber, G. Egle, Makromol. Chem. 54, 119 (1962)) and p-3-butenylstyrene (von Greber, ibid.). The G.F. D'Alelio reference notes in the Synopsis that "crosslinked polymers were obtained when radical and cationic initiators were used". This point is further illustrated with conmnents on page 1253 and data in Table 3 on page 1254. These references teach that cationic polymerization of said monomers to non-crosslinked polymers is not possible. No teaching of the utility of these types of comonomers with isobutylene is disclosed.

SUMMARY OF THE INVENTION

The invention provides a copolymer of an isomonoolefin having from 4 to 7 carbon atoms and containing a copolymerized alkenyl styrene moiety represented by the formula I:

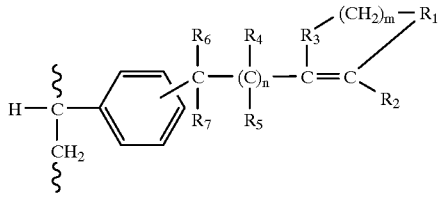

where m=02, n=0–20, each of $R_1$ through $R_7$ are independently selected from the group consisting of hydrogen, $C_1$ $C_{10}$ alkyl and $C_1$ to $C_{10}$ primary or secondary alkyl halides, and at least one of $R_{1,}$ $_{R2}$ or $R_3$ is hydrogen, and when m=1 or 2, $R_3$ and $R_1$ are —$CH_2$—.

The invention further provides a functionalized copolymer of an isomonoolefin having from 4 to 7 carbon atoms and containing a functionalized styrene-type moiety having the formula II:

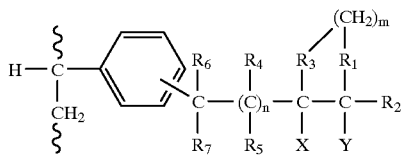

wherein m, n, and $R_1$, $R_3$–$R_7$ are as defined above, and at least one of X and Y is a functional group containing oxygen, sulfur, silicon, nitrogen, carbon, halogen or phosphorous, and not more than one of X and Y is hydrogen.

The invention is grounded on the discovery that isomonoolefin copolymers containing a alkenyl styrene moiety can be prepared under conventional carbocationic polymerization conditions wherein the alkenyl group remains unreacted during the copolymerization leaving it available for post polymerization utility, e.g. crosslinking, grafting and functionalization such as by double bond addition reactions.

DETAILED DESCRIPTION OF THE INVENTION

The copolymers of the present invention are the direct reaction product of an isomonoolefin having 4 to 7 carbon atoms and an alkenyl styrene monomer having the formula III:

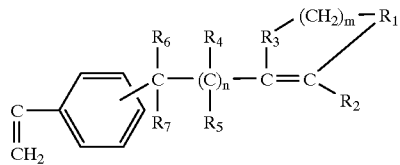

wherein m=0–2, n=0–20, each of $R_1$ through $R_7$ are independently selected from the group consisting of hydrogen, $C_1$ to $C_{10}$ alkyl and $C_1$ to $C_{10}$ primary or secondary alkyl halides, and at least one of $R_1$, $R_2$ or $R_3$ is hydrogen, and when m=1 or 2, $R_3$ and $R_1$ are —$CH_2$—. Preferably $R_1$–$R_7$ are $C_1$–$C_{10}$ groups. m=0, n=0–5, more preferably, $R_1$–$R_7$ are $C_1$–$C_4$ group, m=0, n=0–2, most preferably, n=0, m=0 and $R_1$–$R_3$, $R_6$ and $R_7$ are hydrogen. Although the respective alkenyl groups of this monomer may be in the meta, ortho or para positions, or mixed positions, the preferred position is para and the preferred monomer is 4-allylstyrene. The preferred isomonoolefin comonomer is isobutylene.

Copolymers in accordance with this invention may be produced under conventional cationic polymerization conditions to yield copolymer products having a wide ranging number average molecular weight (Mn) in the range of from about 500 up to about 1,000,000.00 and an average molecular weight distribution Mw/Mn (weight average molecular weight divided by number average molecular weight) of less than about 6, preferably less than about 4, and more preferably less than about 2.5. All molecular weight determinations are made by Gel Permeation chromatography (GPC). The copolymers also may be characterized as having a substantially homogeneous compositional distribution, i.e., they are random copolymers having essentially the same ratio of the isomonoolefin and alkenyl styrene comonomers in all selected fractions of the copolymer.

The copolymers may contain from about 0.1 to 99.9 mol% of the alkenyl styrene moiety and from about 99.9 mol% to 0.1 mol% of the isomonoolefin. Copolymers containing high amounts of the alkenyl styrene moiety i.e., greater than 50 mol% tend to be thermoplastic and resinous in character, whereas those containing higher amounts of the isomonoolefin tend to be elastomeric and rubbery in nature. Preferred copolymers are elastomeric copolymers containing from about 0.5 to 20 mol %, more preferably 0.75 to about 10 mol % of the alkenyl styrene moiety and correspondingly 99.5 to 80 mol %, or 99.25 to 90 mol % of the isomonoolefin. A portion of the alkenyl styrene monomer used in the copolymerization may be replaced by one or more other cationically polymerizable monomers to produce terpolymers or tetrapolymers, e.g., other styrenics such as styrene, paramethylstyrene and alpha-methylstyrene; conjugated alpha-dienes such as isoprene; butadiene; and cyclopentadiene; and like monomers.

Isobutylene and the alkenyl styrene comonomers of the present invention are readily polymerized under cationic conditions. The polymerization can be carried out by means of Lewis acid catalysis. Both traditional and living polymerization systems are operable. Suitable Lewis acid catalysts for the process should be weaker than aluminum trichloride. The preferred catalysts are Lewis acids based on metals from Group 4, 5, 13, 15, and 15 of the Periodic Table of the elements, including boron, aluminum, gallium, indium, titanium, zirconium, tin, vanadium, arsenic, antimony, and bismuth. Nonlimiting examples of weaker Lewis acids include ethylaluminum dichloride, ethylaluminum dibromide, methylaluminum dichloride, methylaluminum dibromide, diethylaluminum chloride, diethylaluminum bromide, dimethylaluminum bromide, dimethylaluminum chloride, alkylaluminoxanes like methylaluminoxane, boron trichloride, boron tribromide, tris(pentafluorophenyl) boron, titanium tetrachloride, titanium tetrabromide, vanadium tetrachloride, and vanadium tetrabromide.

The preferred Lewis acid catalysts may be used in combination with initiators such as tertiary alkyl or aralkyl halides, ethers, or esters. Preferred nonliniting examples include, 2-chloro-2-methylpropane, 2-chloro-2,4,4- trimethylpentane, 1,3,5-tri(1-chloro-1-methylethyl)benzene, and 5-tert-butyl-1,3-di(1-chloro-1-methylethyl)benzene. Other suitable initiators can be found in U.S. Pat. No. 4,946,899.

Several of the weaker Lewis acids listed above have found utility in living isobutylene polymerization. Living polymerization of isobutylene may be achieved using a variety of methods, some of which are described in U.S. Pat. Nos. 5,506,316; 5,418,303; 5,350,819; 5,169,914; and 4,910,321. These systems are also suitable for the copolymerization of isobutylene and the alkenyl styrene comonomers of the present invention. General conditions under which living polymerizations can be achieved include:

(1) a catalyst comprising an initiator of a tertiary alkyl halide, a tertiary aralkyl halide, a tertiary alkyl ether, a tertiary aralkyl ether, a tertiary elkyl ester, a tertiary aralkyl ester, or the like;

(2) a Lewis acid co-initiator which typically comprises a halide of titanium, boron, or aluminum;

(3) a proton scavenger and/or electron donor, (4) a solvent whose dielectric constant is selected considering the choice of the Lewis acid and the monomer in accord with known cationic polymerization systems; and (5) monomers The amount of catalysts employed will depend on the desired molecular weight and the desired molecular weight distribution of the copolymer being produced. Typically, the range will be from about $1 \times 10^{-5}$ mol/L to $2 \times 10^{-2}$ mol/L., and most preferably from $10^{-4}$ to $10^{-1}$ mol/L.

Suitable diluents for the monomers, catalyst components and polymeric reaction products include the general group of aliphatic and aromatic hydrocarbons, used singly or as mixture and $C_1$ to $C_6$ halogenated hydrocarbons used as mixtures with hydrocarbon diluents in an amount up to about 100% by volume of the total diluent fed to the reaction zone. Typically, when the monomers are soluble in the selected diluent the catalysts may not necessary also be soluble therein. Preferred diluents include hydrocarbons such as hexane, pentane, isobutane and the like; alkyl halides such as methylchloride, methylene chloride and the like; aromatic halides such as chlorobenzene; carbon disulfide, carbon dioxide and mixtures thereof Typical of such processes is that described in U.S. Patent 5,543,479, whose disclosure is incorporated herein by reference.

The polymerization may be conducted in any suitable conventional vessel or reactor such as those used in the manufacture of butyl rubber or isobutylene/para-methylstyrene copolymers. The reaction is conducted at temperatures below 0° C. and preferably in the range of −10° C. to about −115° C. and for a period of time sufficient to produce copolymers of the desired molecular weight, e.g., from less than one minute to 5 hours, more preferably from about 5 to 60 minutes. The polymerization reaction may be terminated by adding a quenching agent such as a lower alkyl alcohol, followed by recovery and washing the polymer product. Suitable reactors and reaction conditions for preparing copolymers of this invention are more particularly described in U.S. Pat. No. 5,162,445, the disclosure of which is incorporated herein by reference.

Copolymers of this invention having an average Mn below about 20,000 have particularly good utility in sealant and coating applications, while those having an Mn above 100,000 are particularly useful in applications such as tire innerliners, water hoses, organic fluid hoses, gaskets, adhesive compositions, drive belts and various molded articles.

The copolymers may be readily crosslinked (vulcanized) using conventional sulfur-containing curing recipes, peroxide curing recipes and other curing systems used for curing saturated or unsaturated elastomeric polymers. Graft copolymers may be prepared by polymerizing one or a mixture of free radically polymerizable monomers in the presence of the preformed isomonoolefin/alkenyl styrene copolymer containing the pendant alkenyl group using conventional free radical polymerization methods.

The invention also relates to functionalized copolymers of the structure of formula II above wherein m=0–2, n=0–20, $R_1$ and $R_3$ are independently selected from the group consisting of hydrogen $C_1$ to $C_{10}$ alkyl and $C_1$ to $C_{10}$ primary or secondary alkyl halides, and at least one of X and Y is a functional group containing at least one of the elements oxygen, sulfur, silicon, nitrogen, carbon, halogen phosphorous, and not more than one of X and Y is hydrogen.

Functionalized versions of the copolymers described by formula II above may be prepared by conventional well known chemical reactions such as by simply heating a selected reactive reagent with the alkenylstyrene polymer or by addition reactions such as epoxidation, halogenation, Diels-Alder cyclization and similar reactions involving the pendant alkenyl moiety. Typical specific functional groups, the general reaction type and typical reagents for achieving a representative number of different functionalized copolymers are listed in Table A.

TABLE A

| Functional Group Type | Generic Structure | Reaction Type, Typical Reagents |
|---|---|---|
| Halides | P—C(X)—C(H)— | Hydrohalogenation, e.g. HBr |
|  | P—C(H)—C(X)— | Radical Hydrohalogenation, e.g. HBr/peroxide |
|  | P—C(X)—C(X)— | Electrophilic halogenation, e.g. $Br_2$ |
|  | P—C(HO)—C(X)— | Hydroxyhalogenation, e.g. $Br_2/H_2O$ |
|  | P—C(RO)—C(X)— | Alkoxyhalogenation, e.g. $Br_2$, ROH |
| Amines | P—C(H)—C(NH$_2$)— | Hydroboration-amination, $BH_3/NH_2SO_3H$ Ammonical hypochlorite, $NH_4OH/NaOCl$ |
| Ethers | P—C(RO)—C(H)— | Solvomercuration-demercuration, e.g. 1. ROH, $Hg(O_2CCF_3)_2$, 2. $NaBH_4$, NaOH |

TABLE A-continued

| Functional Group Type | Generic Structure | Reaction Type, Typical Reagents |
|---|---|---|
|  | P—C—C— (with epoxide O bridge) | Epoxidation. e.g. m-chloroperoxybenzoic acid |
| Alcohols | HO on C, P—C—C— | Hydration, e.g. cat H+, H₂O Oxymercuration-demercuration, e.g. 1. Hg(OAc)₂, H₂O 2. NaBH4, NaOH |
|  | H on C, OH on C, P—C—C— | Hydroboration-oxidation, e.g. 1. HB(R)₂, 2. H₂O₂, NaOH |
| Diols | HO OH, P—C—C— | Cis hydroxylation, e.g. KMnO₄, phase transfer catalyst, cold |
| Ketones | O (double bond), P—C—C— | Oxidation, e.g. PdCl₂, CuCl, O₂ |
| Cyclics | cyclohexene with (R)ₙ, P—C—C— | Diels Alder (R = additional structures including functional groups) e.g. cyclopentadiene |

P = polymer

EXAMPLES

In order to illustrate the present invention, the following examples are provided. Such are not meant to limit the invention in any respect, but are solely provided for illustration purposes. Molecular weight values ($M_w$ and $M_n$) were measured by Gel Permeation Chromatography using a Waters 150 C. gel permeation chromatograph equipped with a DRI (differential refractive index) detector and a UV detector set to 254 nanometers. A calibration curve was constructed using narrow molecular weight polyisobutylene standards. The numerical analyses were performed using a commercially available standard Gel Permeation Software package. Percent comonomer incorporation, percent BSB (isobutylene-styrenic- isobutylene triads), and percent double bond retention was determined from proton NMR on a 250 MHz Bruker AC-250 spectrometer from $CDCl_3$ solutions.

Examples 1–8

The copolymerizations for examples 1–8 were prepared at −80° C. by dissolving 3 ml of isobutylene into 12 ml of anhydrous hexane and 8 ml of methyl chloride along with 4AS (4-allylstyrene) and TWCl (2-chloro-2,4,4-trimethylpentane) at the concentrations specified in Table 1. The copolymerizations were started by the addition of the catalyst (EADC: ethylaluminum dichloride, DMAC: dimethylaluminum chloride) and were continued for fifteen minutes. Copolymerizations were stopped by the addition of chilled methanol. The copolymers were isolated by precipitation into methanol and dried in vacuo. The results of the copolymerizations are also listed in Table 1. The DRI and Uv traces were superimposable for each prepared copolymer. ¹H-NMR confirmed 100% retention of the allyl double bond.

Examples 9 and 10

These copolymerizations were prepared in a similar fashion to those in examples 1–8. In example 9, 3 ml of isobutylene was dissolved with 4AS and TMPCL into 20 ml of hexane. In example 10, 10 ml of isobutylene was dissolved with 4AS and tert-butylchloride into 66 ml of hexane. 4AS and TMPCL were added at the concentrations specified in Table 1. The copolymers were isolated as before. The results of the copolymerizations are also listed in Table 1. The DRI and UV traces were superimposable for each prepared copolymer. ¹H-NMR confirmed 100% retention of the allyl double bond.

Examples 11–13

For examples 11–13, copolymerizations were prepared at −80° C. by charging a small resin kettle with 40 ml of hexane, 26 ml of methyl chloride, dimethylphthalate and 0.85 ml of 2.5 molVL solution of DMAC in hexane. This solution was aged three minutes before 10 ml of isobutylene was added (18 ml in example 13). Once again the solution was allowed to age three minutes. Separately, 4AS and TMPCL was dissolved in 1 ml of hexane (12 ml of hexane and 1.3 rnl of methyl chloride in example 13). The polymerization was started by the addition of this last solution (chilled to −80° C.). The copolymerizations were stopped after 50 minutes (46 minutes in example 13) and worked up as described for examples 1–8. The concentration of 4AS, TMPCL and dimethylphthalate along with the results of the copolymerization are given in Table 2. The DRI and UV traces were superimposable for each prepared copolymer. ¹H-NMR confirmed 100% retention of the allyl double bond.

Example 14

The copolymerization was prepared at −30° C. by combining in a resin kettle, 37 ml of hexane, 7 ml of isobutylene, 1,3 ml of 4AS and 5.6 microliters of TNDCL. The polymerization was started by the addition of 25 microliters of a 2.5 mol/L solution of EADC in hexane. The polymerization was stopped in 26 minutes by the addition of chilled methanol. 5.1 grams (87%) of copolymer were recovered. The copolymer had a $M_n$ of 2470 and a $M_w/M_n$ of 5.8. UV and DRI traces of the GPC were superimposable. The copolymer contained 7.7 mol% of 4AS with 20% BSB and 100% retention of the allyl double bond.

Example 15

The copolymerization was prepared at −30° C. by combining 37 ml of hexane, 10 microliters of TMPCL, 1.7. ml of 4AS and 9 ml of isobutylene in a resin kettle. The polymerization was started by the addition of 38 microliters of 2.5 mol/L solution of ethylaluminum dichloride in hexane. The polymerization was stopped after 15 minutes by the addition of chilled methanol. The recovered copolymer, 6.4 grams (85%), had a Mn of 2840 and a $M_w/M_n$ of 6.9. UV and DRI traces of the GPC were superimposable. The copolymer contained 8.0 mol% of 4AS with 32% BSB and 100% retention of the allyl double bond.

Examples 16 and 17

These copolymerizations were prepared at −80° C. by combining 53 ml of hexane, 13 ml of methyl chloride, 13 microliters of TMPCL, 3BS (4(3'-butenyl)styrene), and isobutylene. The copolymerizations were started by the addition of 40 microliters of a 2.5 mol/L EADC solution in hexane. The copolymerizations were run 45 minutes and stopped as before. The concentrations of isobutylene and 3BS as well as the results of the polymerization are listed in Table 3. The DRI and UV traces were superimposable for each prepared copolymer. $^1$H-NMR confirmed 100% retention of the vinyl double bond.

Examples 18–22

These copolymerizations were assembled at −80° C. by combining 40 ml of hexane with 28 ml of methyl chloride and 1.4 ml of a 2.5 mol/L solution of DMAC in hexane and allowing this solution to age. After three minutes, 18 ml of isobutylene was added. Again the solution was allowed to age three minutes. Separately, a solution of 3BS in 2 ml of hexane and 1.3 ml of methyl chloride was prepared. At the end of the second three-minute period, the 3BS solution was added immediately followed by the addition of 13.8 microliters of TMPCL. The copolymerizations were continued for 60 minutes before quenching and working up as before. Table 3 lists the IB and 3BS concentrations as well as the results of the copolymerizations. The DRI and UV traces were superimposable for each prepared copolymer. $^1$H-NMR conrinred 100% retention of the double bond.

Examples 23–28

These copolymerizations were performed at −30° C. Hexane, 37 ml, was combined with 9 ml of isobutylene, 10 microliters of TNPCL and 3BS. The polymerization was started by the addition of a 2.5 mol/L solution of EADC (ethylaluminum dichloride) in hexane. The polymerizations were continued 15 minutes, before quenching and work-up as before. The concentration of 3BS and EADC in the polymerization as well as the results of the polymerizations are listed in Table 4. The DRI and UV traces were superimposable for each prepared copolymer. $^1$H-NMR confirmed 100% retention of the I double bond.

FUNCTIONAL GROUP CONVERSION EXAMPLES

Example 29

0.5 grams of the copolymer from example 11 was dissolved into 50 ml of chloroform. Separately, 226 milligrams of MCPBA (m-chloroperoxybenzoic acid) was dissolved/suspended into 5 ml of chloroform. The two solutions were combined and allowed to stir at room temperature overnight. The polymer was then precipitated into methanol and dried in vacuo. The dried polymer was characterized by $^1$H-NMR and found to have an 84% conversion of the allyl groups to epoxide.

Example 30

In this example, 0.366 grams of the copolymer from example 14 was used with 418 milligrams of MCPBA. The reaction was run as in example 29. The dried polymer was characterized by $^1$H-HMR and found to have 100% conversion of the allyl groups to epoxide.

Example 31

The copolymer from example 17 (0.5 grams) was used along with 200 mg of MCPBA under conditions similar to example 29. The dried polymer was characterized by $^1$H-NMR and found to have 10% conversion of the allyl group to epoxide.

Example 32

0.37 grams of the copolymer from example 14 was dissolved into 18 ml of anhydrous tetrahdrofuran under nitrogen. Into this solution was injected 2.3 ml of a 0.5 mol/L solution of 9-borabicyclo[3.3.1]nonane. The reaction was allowed to continue three days. The borane was reduced by the dropwise addition of 15 ml of a solution 2.5 mol/L in sodium dihydrogenphosphate and potassium hydrogenphosphate and 0.37 ml of 30% aqueous hydrogen peroxide. The reaction was continued for 1 hour. The organic phase was then separated and poured into acetone. The polymer was dissolved into a solution of 80 parts toluene and 20 parts isopropanol and reprecipitated into methanol. The polymer was dried in vacuo. $^1$H-NMR characterization of the polymer showed 100% conversion of the allyl double bond into a primary alcohol.

Example 33

The copolymer from example 25 (0.5 grams) was dissolved into 10 ml of chlorobenzene and dried over calcium hydride for two hours. The solution was then filtered to remove the calcium hydride. Seventy microliters of dimethylphenylsilane was then added with 0.16 grams of hexachloroplatinic acid. The reaction was heated and stirred for 2 hours at 80° C. After cooling, the solution was filtered and the chlorobenzene removed in vacuo. The polymer was re-dissolved into chloroform and washed with water and treated with activated charcoal to remove color. The solution was filtered and solvent removed in vacuo. $^1$H-NMR of the product demonstrated complete conversion of the double bond to the organosilane.

TABLE 1

| Example | [Initiator] (mol/L) | Catalyst, [catalyst] (mol/L) | [4-AS] (mol/L) | Time (min.) | Yield (grams) | $M_n$ | $M_w M_n$ | % CoM Incorp. | % BSB |
|---|---|---|---|---|---|---|---|---|---|
| 1 | $8.3 \times 10^{-4}$ | EADC, $1.7 \times 10^{-3}$ | $3.3 \times 10^{-2}$ | 15 | 2.1 | 8,390 | 5.3 | 1.4 | 70 |
| 2 | $6.2 \times 10^{-4}$ | DMAC, $2.8 \times 10^{-2}$ | $3.3 \times 10^{-2}$ | 30 | 2.2 | 146,500 | 1.7 | 2.0 | 54 |
| 3 | $6.2 \times 10^{-4}$ | DMAC, $2.8 \times 10^{-2}$ | $3.3 \times 10^{-2}$ | 30 | 2.2 | 125,400 | 1.7 | 1.3 | 61 |
| 4 | $6.2 \times 10^{-4}$ | DMAC, $2.8 \times 10^{-2}$ | $6.6 \times 10^{-2}$ | 30 | 2.2 | 114,400 | 1.7 | 2.6 | 50 |
| 5 | $6.2 \times 10^{-4}$ | DMAC, $2.8 \times 10^{-2}$ | $9.9 \times 10^{-2}$ | 30 | 2.2 | 132,700 | 1.5 | 3.9 | 34 |
| 6 | $6.2 \times 10^{-4}$ | EADC, $1.7 \times 10^{-3}$ | $3.3 \times 10^{-2}$ | 15 | 2.2 | 20,100 | 4.4 | 1.2 | 71 |
| 7 | $6.2 \times 10^{-4}$ | EADC, $1.7 \times 10^{-3}$ | $6.6 \times 10^{-2}$ | 15 | 2.2 | 18,000 | 4.4 | 2.3 | 60 |
| 8 | $6.2 \times 10^{-4}$ | EADC, $1.7 \times 10^{-3}$ | $9.9 \times 10^{-2}$ | 15 | 2.2 | 21,200 | 3.9 | 3.7 | 49 |

TABLE 1-continued

| Example | [Initiator] (mol/L) | Catalyst, [catalyst] (mol/L) | [4-AS] (mol/L) | Time (min.) | Yield (grams) | $M_n$ | $M_w M_n$ | % CoM Incorp. | % BSB |
|---|---|---|---|---|---|---|---|---|---|
| 9 | $6.2 \times 10^{-4}$ | EADC, $1.7 \times 10^{-3}$ | $3.0 \times 10^{-2}$ | 15 | 2.1 | 41,300 | 3.8 | 1.0 | 80 |
| 10 | $8.6 \times 10^{-4}$ | EADC, $8.8 \times 10^{-4}$ | $2.9 \times 10^{-2}$ | 60 | 3.8 | 116,700 | 3.2 | 4.0 | 42 |

TABLE 2

| Example | [Initiator] (mol/L) | [Dimethylphthalate] (mol/L) | [4-AS] (mol/L) | Yield (grams) | $M_n$ | $M_w M_n$ | % CoM Incorp. | % BSB |
|---|---|---|---|---|---|---|---|---|
| 11 | $6.2 \times 10^{-4}$ | $8.0 \times 10^{-5}$ | $2.9 \times 10^{-2}$ | 5.7 | 130,000 | 1.2 | 1.2 | 64 |
| 12 | $6.2 \times 10^{-4}$ | $8.0 \times 10^{-5}$ | $7.3 \times 10^{-2}$ | 7.4 | 121,700 | 1.5 | 3.6 | 36 |
| 13 | $7.6 \times 10^{-4}$ | $1.5 \times 10^{-4}$ | $4.9 \times 10^{-2}$ | 12.0 | 157,000 | 1.16 | 1.3 | 59 |

TABLE 3

| Example | [1B] (mol/L) | [3BS] (mol/L) | Yield (grams) | $M_n$ | $M_w/M_n$ | % CoM Incorp. | % BSB |
|---|---|---|---|---|---|---|---|
| 16 | 1.6 | $7.4 \times 10^{-2}$ | 6.6 | 8,080 | 5.6 | 3.4 | 44 |
| 17 | 1.5 | $3.8 \times 10^{-2}$ | 5.6 | 9,020 | 6.1 | 2.0 | 20 |
| 18 | 2.5 | $4.8 \times 10^{-2}$ | 11.8 | 112,100 | 1.8 | 1.2 | 66 |
| 19 | 2.5 | $9.0 \times 10^{-2}$ | 12.5 | 174,000 | 2.0 | 2.6 | 46 |
| 20 | 2.5 | $4.5 \times 10^{-2}$ | 11.6 | 90,700 | 2.0 | 1.5 | 62 |
| 21 | 2.5 | $9.0 \times 10^{-2}$ | 11.8 | 141,200 | 1.7 | 2.9 | 48 |
| 22 | 2.5 | $1.4 \times 10^{-1}$ | 13.0 | 85,600 | 2.1 | 4.0 | 37 |

TABLE 4

| Example | [3BS] (mol/L) | [EADC] (mol/L) | Yield (grams) | $M_n$ | $M_w/M_n$ | % CoM Incorp. | % BSB |
|---|---|---|---|---|---|---|---|
| 23 | 0.21 | $1.2 \times 10^{-2}$ | 6.3 | 14,200 | 3.3 | 14.2 | 8 |
| 24 | 0.11 | $2.1 \times 10^{-3}$ | 6.0 | 6,480 | 4.1 | 4.7 | 26 |
| 25 | 0.11 | $2.0 \times 10^{-3}$ | 5.9 | 5,420 | 2.8 | 4.6 | 37 |
| 26 | 0.11 | $1.2 \times 10^{-2}$ | 5.9 | 4,300 | 3.3 | 4.1 | 38 |
| 27 | 0.22 | $1.2 \times 10^{-2}$ | 6.9 | 3,480 | 3.7 | 7.5 | 20 |
| 28 | 0.33 | $1.2 \times 10^{-2}$ | 7.8 | 6,180 | 4.1 | 9.3 | 10 |

What is claimed is:

1. A copolymer of an isomonoolefin having from 4 to 7 carbon atoms and an alkenyl styrene moiety represented by the formula:

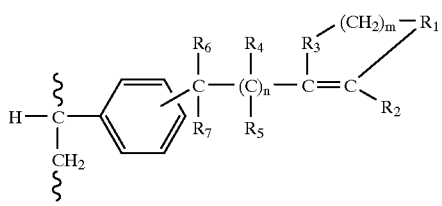

wherein m =0–2, n=0–20, each of $R_1$ through $R_3$ are independently selected from the group consisting of hydrogen and $C_1$ to $C_{10}$ alkyl, each of $R_4$ through $R_7$ are independently selected from the group consisting of hydrogen, $C_1$ to $C_{10}$ alkyl and $C_1$ to $C_{10}$ primary or secondary alkyl halides, and at least one of $R_1$, $R_2$, or $R_3$ is hydrogen, and when m =1 or 2, $R_3$ and $R_1$ are —CH$_2$—.

2. The copolymer of claim 1 containing from about 0.1 to 99 mol% of said alkenyl styrene and from about 99.9 to 1 mol % of said isomonoolefin.

3. The copolymer of claim 1 wherein said alkenyl styrene is represented by the formula:

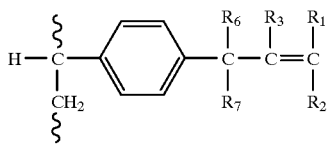

wherein each of $R_1$, $R_2$ and $R_3$ are independently selected from the group consisting of hydrogen and $C_1$ to $C_{10}$ alkyl, $R_6$ and $R_7$ are independently selected from the group consisting of hydrogen, $C_1$ to $C_{10}$ alkyl and $C_1$ to $C_{10}$ primary or secondary alkyl halides, and at least one of $R_1$, $R_2$, or $R_3$ is hydrogen.

4. The copolymer of claim 1 wherein $R_6$ and $R_7$ are each hydrogen.

5. The copolymer of claim 2 containing from about 0.5 to 20 mol% of said alkenyl styrene and about 99.5 to 80 mol% of said isomonoolefin.

6. The copolymer of claim 1 wherein said isomonoolefin is isobutylene and said alkenyl styrene is 4-allyl styrene.

7. A functionalized copolymer of an isomonoolefin having from 4 to 7 carbon atoms and a functionalized styrenic-type moiety represented by the formula:

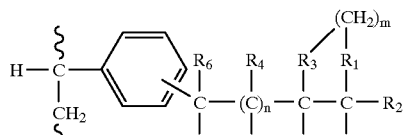

wherein m=0–2, n=0–20, each of $R_1$ through $R_3$ are independently selected from the group consisting of hydrogen and $C_1$ to $C_{10}$ alkyl, each of $R_4$ through $R_7$ are independently selected from the group consisting of hydrogen, $C_1$ to $C_{10}$ alkyl and $C_1$ to $C_{10}$ primary or secondary alkyl halides, and at least one of $R_1$, $R_2$, $R_3$ is hydrogen, and when m=1 or 2, $R_3$ and $R_1$ are —CH$_2$—, and at least one of X and Y is a functional group containing oxygen, sulfur, silicon, nitrogen, carbon, halogen or phosphorous, and not more than one of X and Y is hydrogen.

8. A process for preparing a copolymer of an isoolefin having from 4 to 7 carbon atoms and an alkenyl styrene moiety represented by the formula:

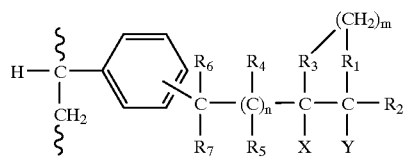

wherein m=0–2, n=0–20, each of $R_1$ through $R_3$ are independently selected from the group consisting of hydrogen and $C_1$ to $C_{10}$ alkyl, each of $R_4$ through $R_7$ are independently selected from the group consisting of hydrogen, $C_1$ to $C_{10}$ alkyl and $C_1$ to $C_{10}$ primary or secondary alkyl halides, and at least one of $R_1$, $R_2$, or $R_3$ is hydrogen, and when m=1 or 2, $R_3$ and $R_1$ are —$CH_2$—;

said process comprising contacting the isoolefin and styrenic moiety under cationic polymerization conditions comprising a Lewis Acid Catalyst, said Lewis Acid Catalyst being weaker than aluminum trichloride.

* * * * *